United States Patent [19]

Packer et al.

[11] Patent Number: 4,613,259

[45] Date of Patent: Sep. 23, 1986

[54] APPARATUS FOR CONTROLLING POWDER FLOW RATE IN A CARRIER GAS

[75] Inventors: Louis L. Packer, Enfield; George S. Bosshart, Vernon; Mark R. Jaworowski, Enfield; Urban E. Kuntz, East Hartford, all of Conn.

[73] Assignee: United Technologies Corporation, Hartford, Conn.

[21] Appl. No.: 675,807

[22] Filed: Nov. 28, 1984

[51] Int. Cl.[4] .............................................. B65G 53/66

[52] U.S. Cl. ........................................ 406/14; 239/79; 406/19; 406/30; 406/31

[58] Field of Search ........................ 406/14, 30, 19, 31; 239/79, 69, 85

[56] References Cited

U.S. PATENT DOCUMENTS 2,905,538 9/1959 McIntire ........................... 406/30 X
3,163,329 12/1964 Mornas ............................. 406/30 X
4,341,107 7/1982 Blair et al. ......................... 73/195 X
4,368,678 1/1983 Ulveling ........................... 406/14 X

*Primary Examiner*—Jeffrey V. Nase
*Attorney, Agent, or Firm*—Charles E. Sohl

[57] ABSTRACT

Apparatus for delivering two or more powders at any controlled ration to a thermal spray apparatus permits the controlled production of graded sprayed coatings. The apparatus also monitors and controls the position of the spray apparatus relative to the workpiece and varies this position during the deposition of the sprayed layers. The apparatus includes in-process mass flow gauges which measure in real time the flow rates of the various powders and report these rates to a supervisory controller which verifies these rates against the predetermined schedule and can shut down the apparatus in the event of a malfunction. The substrate being sprayed has its substrate temperature monitored and controlled according to a predetermined schedule by a supervising controller.

1 Claim, 8 Drawing Figures

APPARATUS FOR CONTROLLING POWDER FLOW RATE IN A CARRIER GAS

DESCRIPTION

1. Technical Field

This invention relates to apparatus for controllably thermal spraying two or more powders on a substrate while simultaneously controlling substrate temperature, and gun to substrate position according to a predetermined schedule. This apparatus was developed with specific application to the production of gas turbine engine air seals, however, a variety of other industrial uses can readily be envisioned.

2. Background Art

The present invention relates to powder blending apparatus particularly for use with thermal spray equipment. As used herein, thermal spray techniques will be understood to include both flame and plasma spraying procedures.

In the application of coatings by thermal spray techniques it is frequently desirable to provide coatings which are a blend or mixture of two or more distinct constituents. The characteristics of such constituents are often such that preblending in a single hopper is not feasible, due perhaps to reactivity problems or difficulties in maintaining a uniform blend because of differences in density or particle size. Furthermore, it is frequently desired to provide a coating wherein the composition varies as a function of coating thickness. For example, it is well known that ceramic coatings applied directly to metallic substrates are often unduly sensitive to thermal expansion because of the relative differences in thermal expansivity between the metal substrate and the ceramic coating. In such instances it is desirable to provide a coating which varies as a function of coating thickness from metal adjacent the substrate to ceramic at the outer surface. Additionally in the production of such graded coatings it is known to control the substrate temperature in order to prestress the coating. For the development of graded coatings, one procedure involves the use of multiple spray guns, one gun being phased out while another or others are gradually phased in. This is described in U.S. Pat. No. 3,545,944. Another alternative is disclosed in Winsler et al, U.S. Pat. No. 3,378,391 wherein multiple feedlines from separate powder sources are fed into a spray gun of special design and mixed therein. U.S. Pat. No. 3,912,235 describes a powder feed apparatus for use in conjunction with thermal spraying having several sources of powder which are fed into a mixer and thence to a plasma spray gun wherein the powder is fed through solenoid-operated on/off valves to permit a mixture or combination of powders.

DISCLOSURE OF INVENTION

According to the invention a plurality of subsystems are provided each of which controls the delivery of one powder species to the spraying apparatus. Each subsystem takes as inputs carrier gas and powder. The carrier gas and the powder feed rate are controlled by a supervisory controller which may, for example, be a minicomputer. The minicomputer also controls a positive shutoff valve which is used to terminate the flow of powder when not needed. The controller takes as its input the carrier gas mass flow rate as determined by an appropriate mass flow transducer, the carrier gas pressure as determined by another transducer and the total density of the mixed powder and carrier gas stream as determined by a radiation transmission gauge. Using the carrier gas mass flow, pressure and the density of the mixture of carrier gas and powder, the controller can calculate the powder mass flow rate in real time. The controller contains in its memory a predetermined schedule for powder feed rate as a function of coating thickness and the controller varies the powder feed rate and carrier gas flow rate in order to comply with this predetermined schedule.

The controller controls the multiple subsystems in order to arrive at the desired final sprayed composition. The controller also controls the substrate temperature and the relative position between the thermal spraying apparatus and the substrate.

The foregoing and other objects, features and advantages of the present invention will become more apparent from the following description of preferred embodiments and accompanying drawings.

BEST MODE FOR CARRYING OUT THE INVENTION

Figure 1:
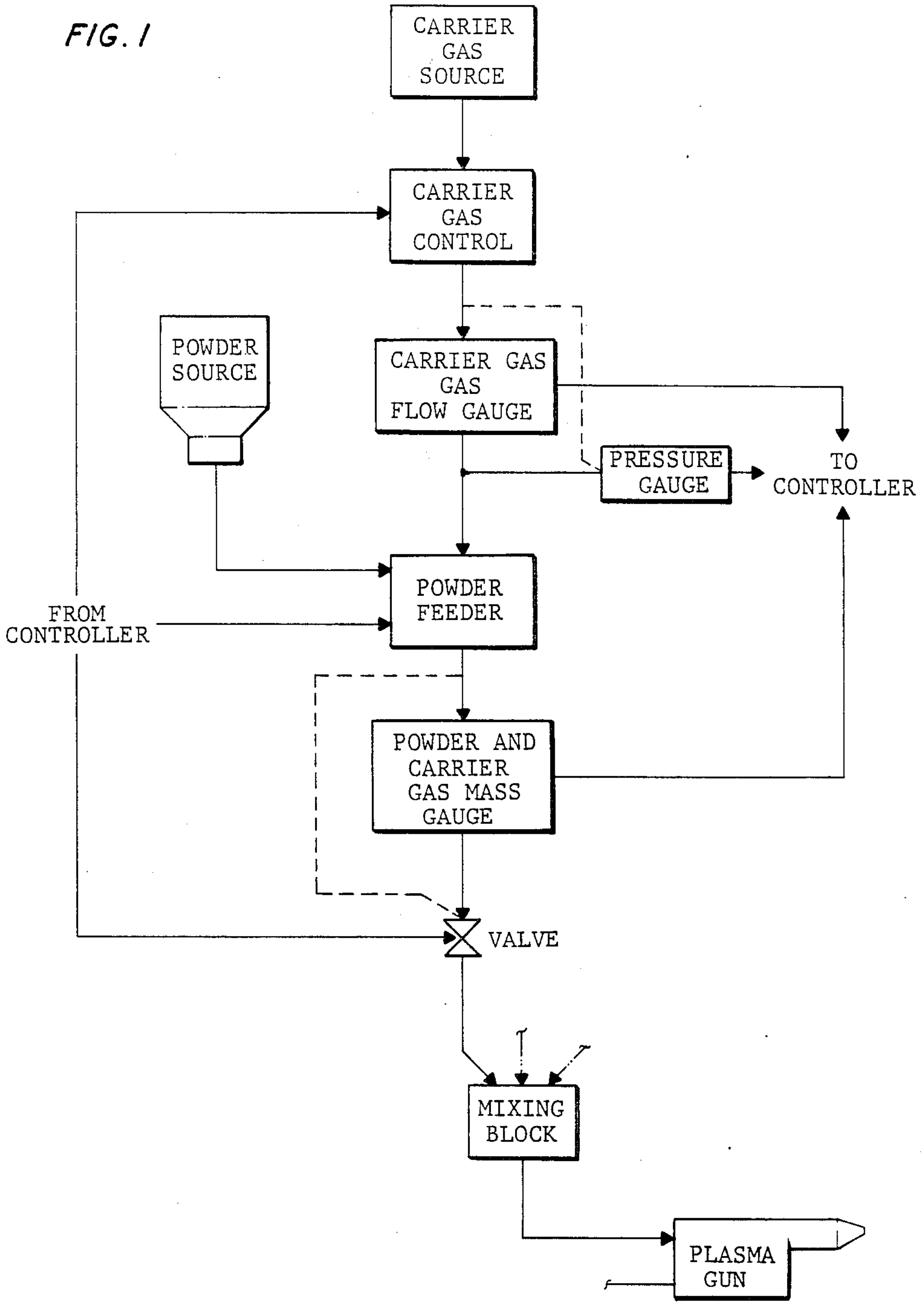
FIG. 1 is a block diagram of a powder feed subsystem.

FIG. 1 shows a block diagram of one subsystem which controls the flow rate of a single powder to the thermal spray apparatus. Similar subsystems (not shown) would be provided for each powder species.

The subsystem controls the powder feed rate through the use of a powder feeder which can deliver a variable rate of powder in response to an input signal. In the particular system described herein, powder feeders as provided by the Plasmadyne Corporation were employed. These feeders have a peforated rotating horizontal disk, the perforations of which pass over one or more perforations in an underlying stationary disk and the rate of powder passage through the feeder can be controlled by varying the rotational speed of the rotating disk. While such feeders are well known in the art, it has not heretofore been known to make measurements of the powder flow rate in real time and use these measurements in a feedback arrangement to correct the powder feeder operation in order to comply with a desired result.

This real time control is accomplished as described in the FIG. 1 block diagram. The subsystem has inputs of powder and carrier gas. The carrier gas passes through a carrier gas flow control valve which is operable in such a way as to vary the flow rate of the carrier gas in accordance with a control signal. The carrier gas leaving the carrier gas flow controller is measured to determine its pressure and flow rate. These measurements are made by commercially available gauges which provide output signals indicative of the values measured. In the system described herein the carrier gas mass flow is measured by a gauge which measures gas flow by the transfer of heat from a heater to a downstream thermocouple, and the particular gauge employed was manufactured by the Mathison Company. The pressure is monitored by a standard pressure gauge, for example one manufactured by the Setrax Company was employed in the system described. The output of the powder feeder comprises the carrier gas the characteristics of which are known and the powder which is entrained in the carrier gas by the powder feeder. The characteristics of the combined stream are measured by a nuclear transmission gauge. The full details of this gauge are described in U.S. patent application Ser. No. 675,801 filed on even date herewith. Briefly, the gauge comprises a thin wall conductive tube which is essentially transparent to the radiation employed and which is electrically grounded. Through this tube is passed appropriate radiation (for example radiation from an Iron 55 source) which is detected on the opposite side of the tube by an appropriate detector (for example an ion chamber). The gauge can readily be calibrated at a variety of powder flow rates and the signal can then be used as an indicator of the total mass flow through the gauge. Signals from the carrier gas mass flow transducer, the carrier gas pressure gauge transducer and the nuclear radiation transducer are used input signals to a supervisory controlling apparatus for example a minicomputer. These three input signals can be treated by the computer and used to determine the powder mass flow rate according to the equation $$\text{Powder Mass Flow Rate} = [F + A]\frac{\text{Log}(Io/I)}{PM}$$

where

F=carrier gas mass flow rate,

A=cross sectional area of the gauge tube X gravitational velocity of particles in still gas X density of carrier gas, Io=radiation transmission through gas stream without powder, I=radiation transmission through flowing gas and powder combination, M=attenuation coefficient, P=pressure, wherein M and A can be determined by calibration.

An essential and novel feature of the invention is that the measurement of powder mass flow is made in real time (with a time constant on the order of 5–10 seconds). It is well known by those skilled in the art that the characteristics of powder are extremely variable due in large part to the high surface area of powder. The characteristics of powder and in particular the flow characteristics of powder are extremely sensitive to moisture content and static charge which can be induced in the powder by flow thereof. Attempts in the prior art to use powder feeders operating on a fixed schedule to supply powder to thermal spray apparatus in attempts to deposit graded or layered coatings have in large part been unsuccessful or at least highly erratic due to the variable nature of the powder flow rates. It will be appreciated that the present invention overcomes these deficiencies by nature of its real time and feedback characteristics.

Figure 2:
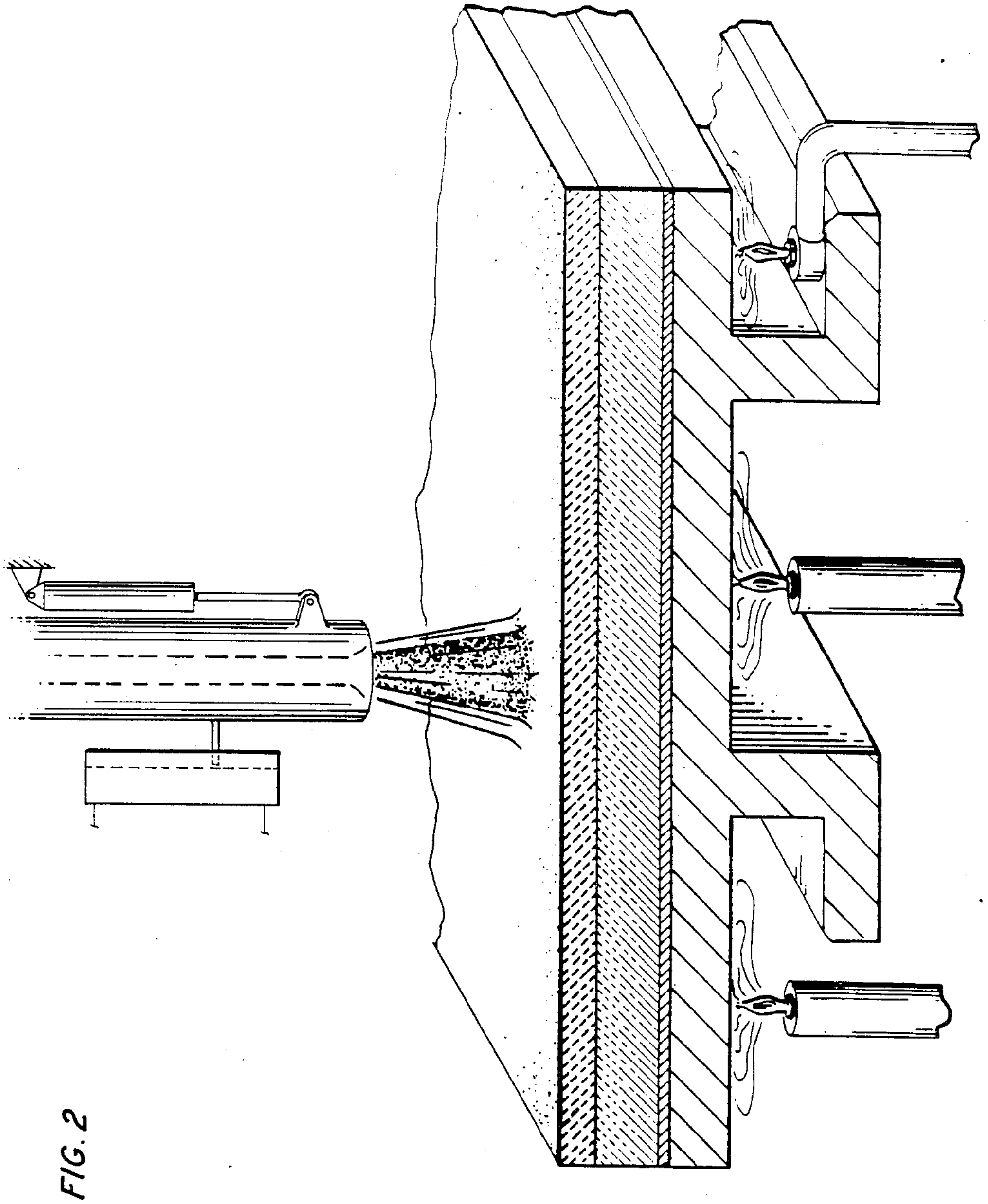
FIG. 2 illustrates the measurement and control of the substrate temperature and position relative to the gun.

FIG. 2 illustrates two other process parameters which are monitored and controlled according to the present invention. These are substrate temperature and relative position between the thermal spray apparatus and the substrate.

It is known to those skilled in the art that the substrate temperature has an effect on the properties and prestress condition of thermally sprayed coatings. In particular when depositing coatings such as ceramics which have coefficients of thermal expansion which are drastically different from those of the substrate, the substrate temperature during the deposition of the coating has been observed to play a role in the subsequent behavior of the coating under varying thermal conditions. Thus, for example in U.S. Pat. No. 4,481,237 dealing with the deposition of layered coatings of mixed metal ceramic composition, it has been found that varying the substrate temperature during the deposition of the various coatings permits the development of a durable layered ceramic coating. This U.S. patent is incorporated herein by, reference. U.S. patent application Ser. No. 675,806 filed on even date herewith further develops these concepts to the deposition of a continuously graded material. The contents of this application are also incorporated herein by reference. As shown in the figure the substrate being sprayed is preferably heated by a heating means and preferably has its temperature monitored by appropriate temperature sensors (for example thermocouples in contact with the substrate) according to a schedule which is predetermined to produce the desired residual stress in the deposited coating. Such heating may be accomplished for example by propane burners whose gas flow (and resultant heat output) is controlled by a signal from the supervisory controller which in turn develops a control signal by comparing the measured substrate temperature with that specified by the predetermined schedule. Of course it is apparent that alternate means of heating can be employed such as for example induction heating and that alternate means of substrate temperature measurement can be employed such as optical pyrometry.

In a similar fashion, it is known that the distance between the thermal spray apparatus and the substrate has an effect on the nature of the deposited coating. In particular, reducing the distance between the gun and the substrate produces a denser coating due to the higher velocity of the particles impacting on the coating. The denser coatings are generally stronger coatings. While strength may be desired in some portions of the coating, in other portions of the coating strength may be not be desired and may in fact be a hindrance. By varying the distance between the gun and the substrate during the deposition of the graded coating, coating durability may be enhanced by varying the strength and density of the coating as a function of thickness. Having described the system in detail, we will now describe certain features of the system and its operation which are believed essential to satisfactory use of the system.

Referring to FIG. 1, there is shown a valve which is operated by a signal from the supervisory controller. This valve is essential to prevent the flow of the wrong constituent into the thermal spray apparatus. Thus, for example, in spraying an all ceramic layer in a seal it might be catastrophic to have a metallic constituent appear in that layer even in small amounts. For this reason it is essential that positive flow control and shutoff be accomplished. While in the prior art various solenoid operated mechanical valves have been employed such valves wear quickly and are subject to leakage with wear. We choose to employ so-called pinch valves which consist of rubber tubing through which the powder and gas flow stream pass, said rubber tubing being surrounded by a chamber which can be filled with a compressed fluid at high pressure to pinch off the tube and prevent flow. We have found that such valves are entirely satisfactory in totally preventing flow and are surprisingly wear resistant.

In our system development we have observed powder flow from the feeder employed is somewhat nonlinear as a function of time, it has been found that initially upon actuation of the feeder more powder is fed than is desired but that over a period of some 20 or 30 seconds the equilibrium flow rate is achieved. In order to provide coatings of controlled composition, we have built into the software of the supervisory controller correction factors which compensate for this initial surge of powder flow.

Figure 3:
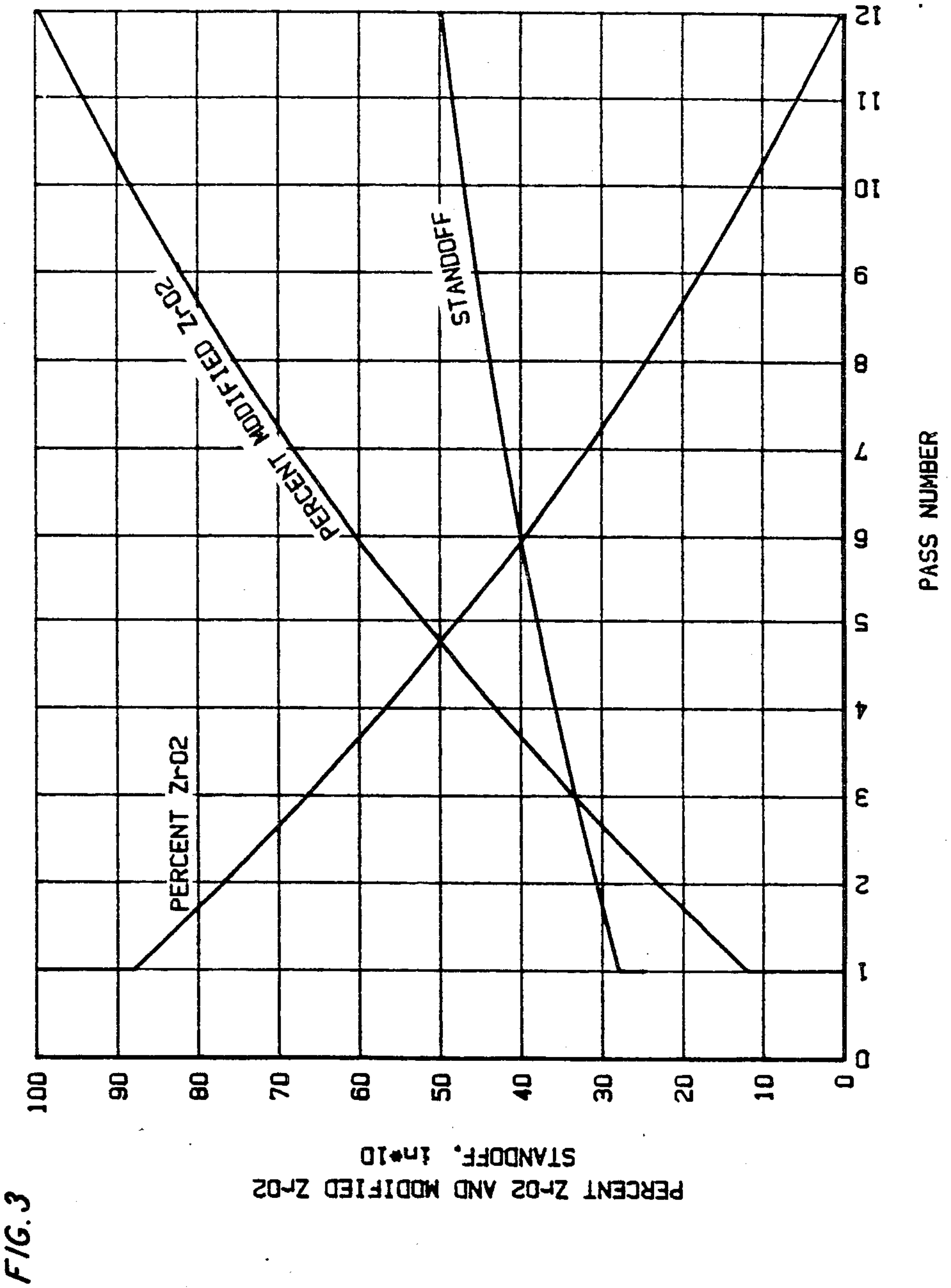
FIG. 3 shows an example of the variation in powder flows and gun to substrate position during a specific interval.

FIG. 3 illustrates how this system can be prescheduled to produce a particular result. In this case what is illustrated is what is referred to as the triple crossover which describes the system behavior in terms of relative powder flow rates and distance between the gun and substrate during a transition from a coating of dense $ZrO_2$ to a coating of porous $ZrO_2$ which is produced by cospraying $ZrO_2$ and polyester powder (the polyester powder being subsequently removed by heating to elevated temperatures). In the development of a particular seal design it was found that failure often occurred at the boundary between the dense $ZrO_2$ and the porous $ZrO_2$. This defect was substantially alleviated by having the distance between the thermal spray apparatus and the substrate vary with relative powder contents as shown in the graph so that during the application of the fully dense $ZrO_2$ powder the gun was about three inches from the substrate whereas during the application of the porous $ZrO_2$ layer the gun was about five inches from the substrate. This variation in distance between the gun and the substrate was found to solve the problem previously encountered.

As a quality control technique, a in-process radiation transmission measurement has been utilized which can with appropriate mathematical manipulation be used to generate a signal showing the thickness of the various layers. While this technique has only to date been used as a quality control technique it is apparent that it could also be used as a control signal to the supervisory computer to modify the powder feed schedule in order to achieve a desired result.

Figure 4:
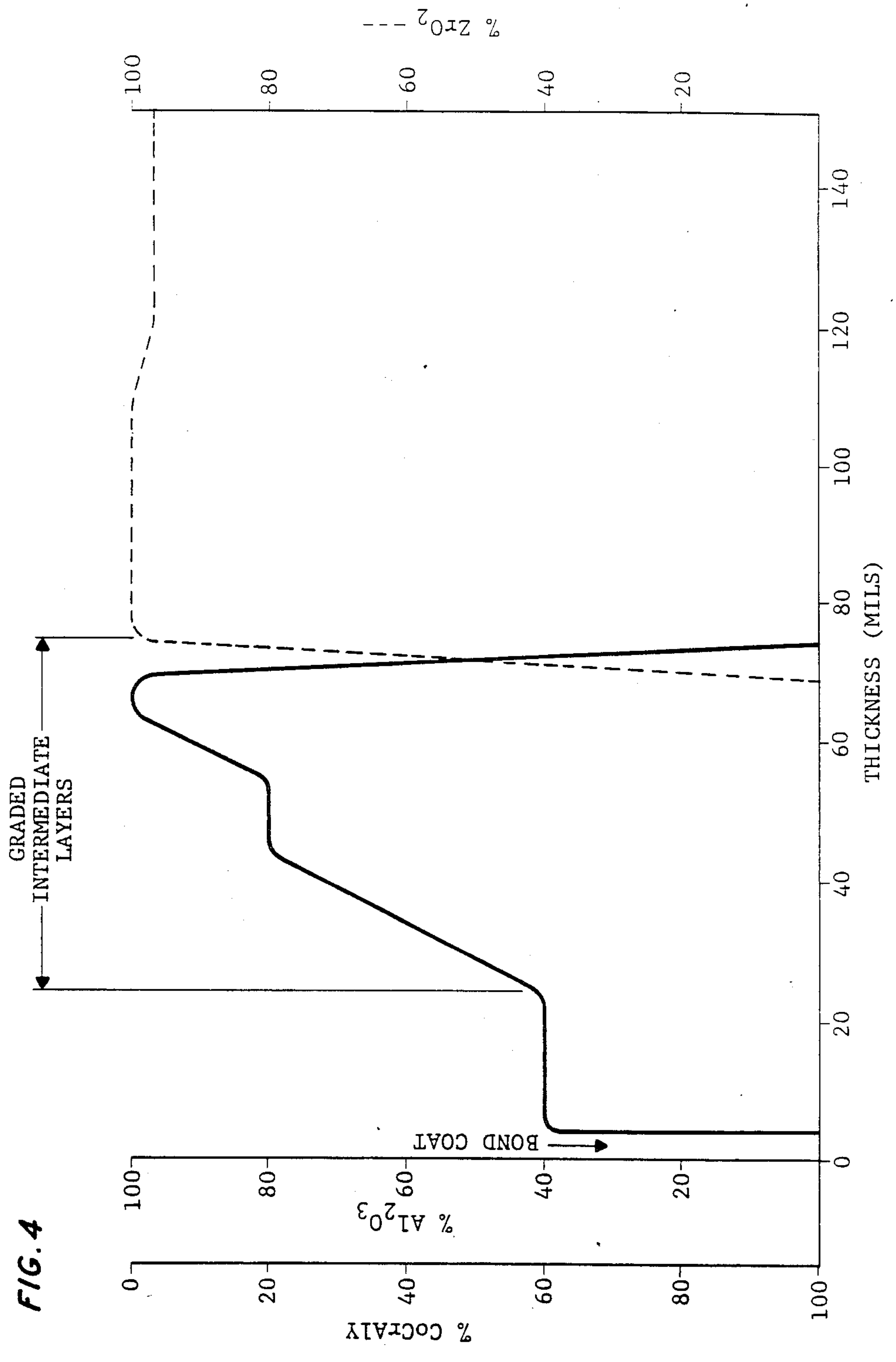
FIG. 4 shows the composition profile through a seal made by the invention apparatus.

FIG. 4 illustrates a composition profile for a particular seal, representing the best seal design arrived at to date.

Figure 5:
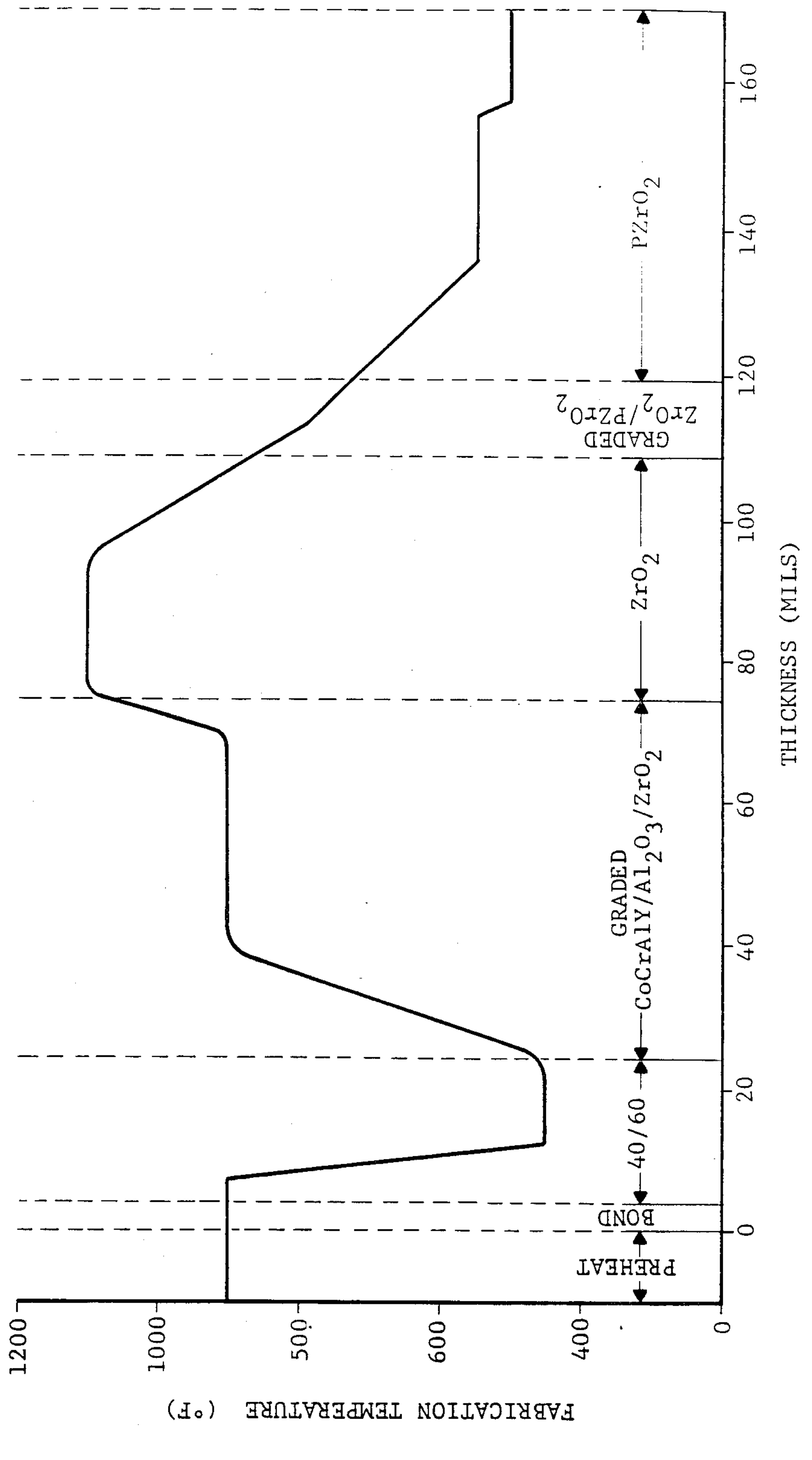
FIG. 5 shows the substrate temperature during deposition of the FIG. 4 composition.

FIG. 5 illustrates a substrate temperature schedule applicable to the production of the seal described in FIG. 4.

Figure 6:
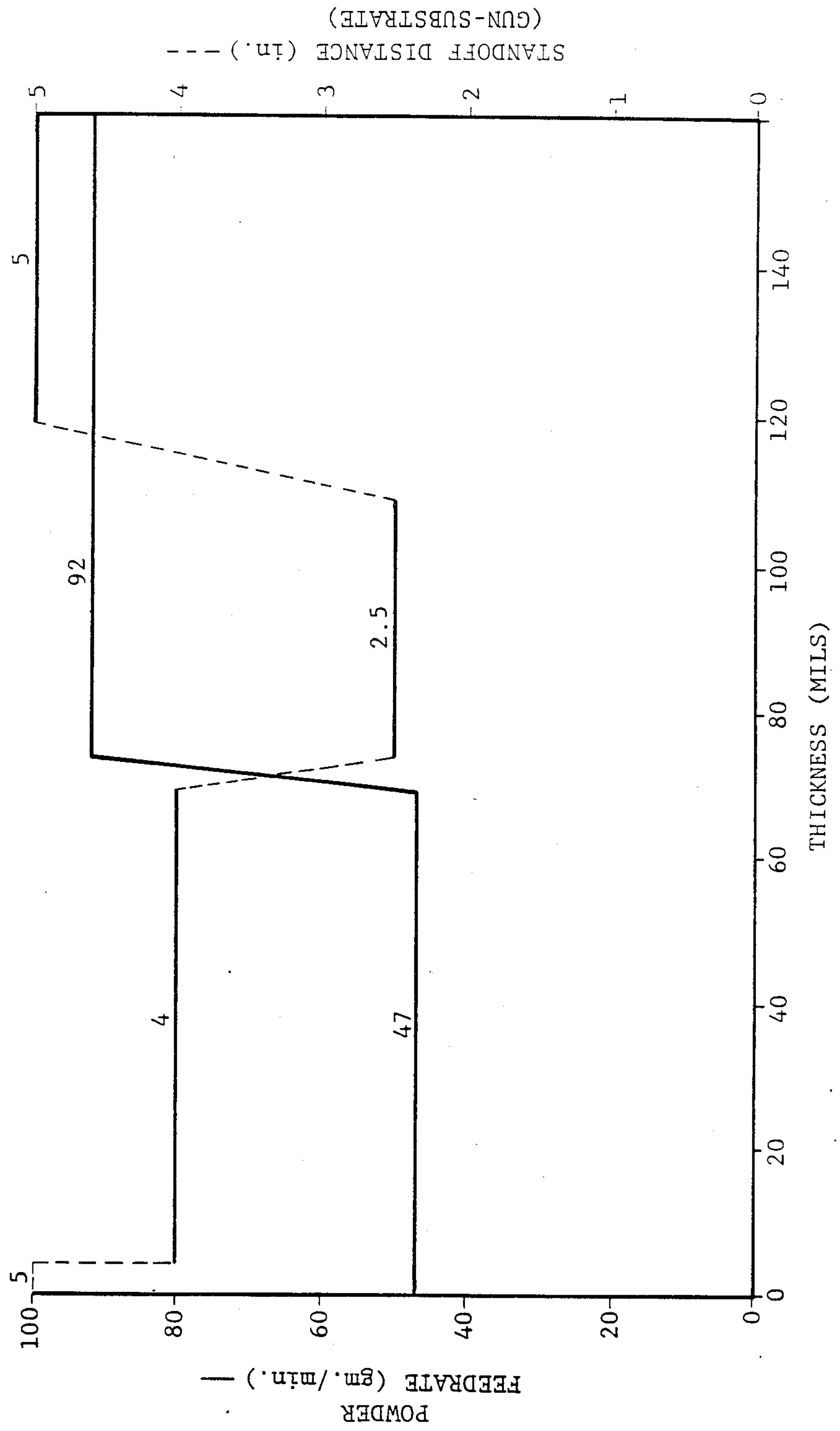
FIG. 6 illustrates variation in gun-substrate position.
Figure 7:
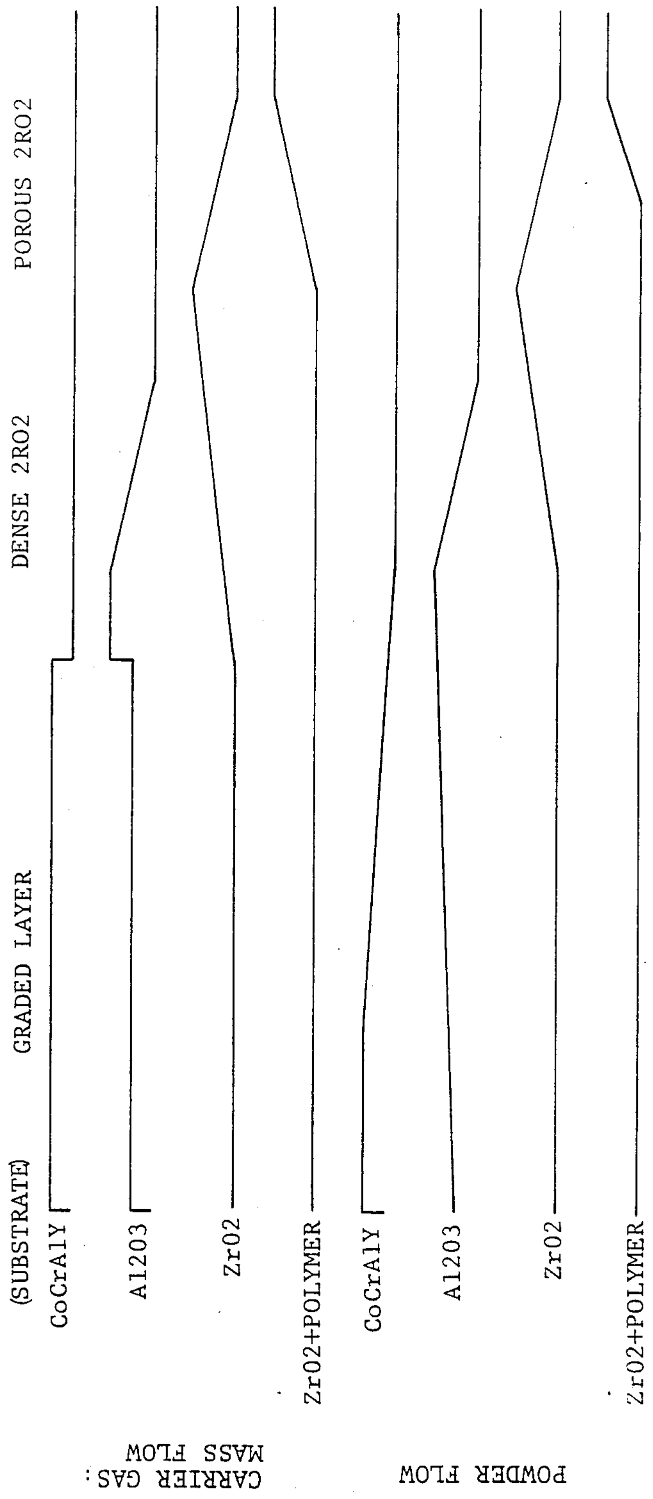
FIG. 7 shows the variation in system parameters during operation.
Figure 8:
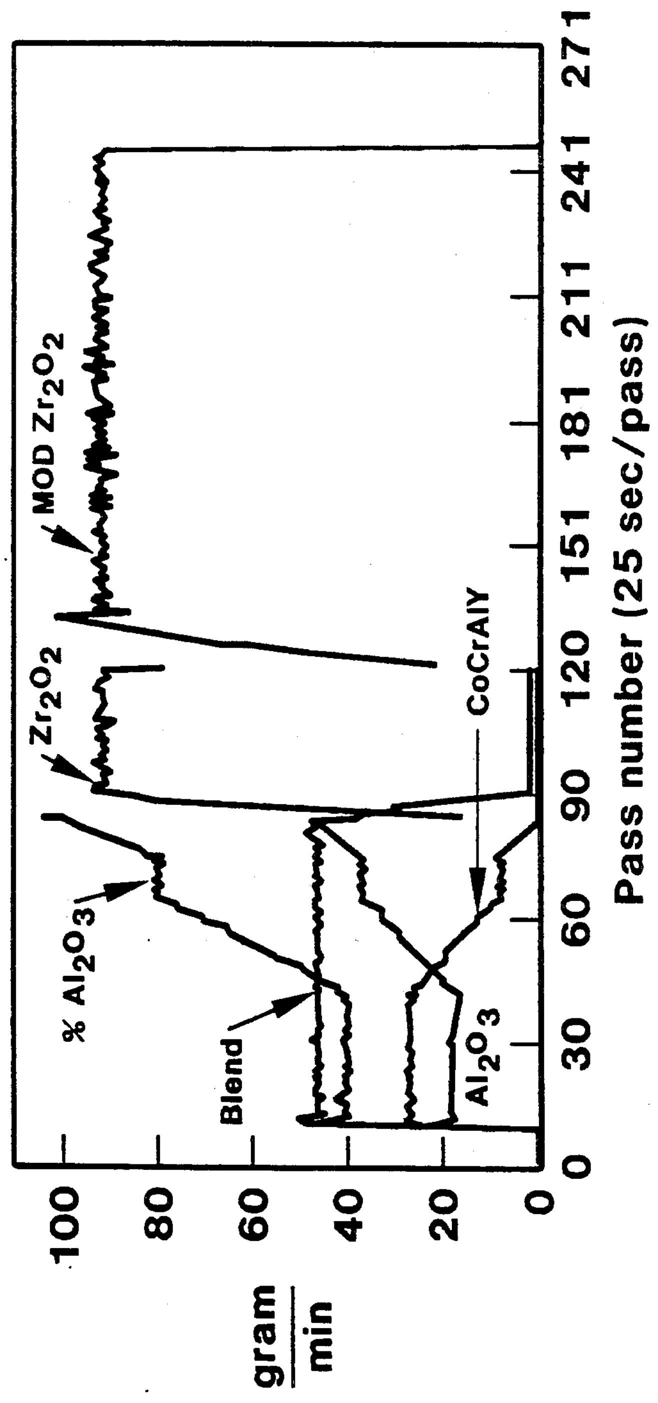
FIG. 8 shows the measured parameter valves.

FIG. 6 illustrates the thermal spray gun-substrate distance during the production of the seal and FIG. 7 indicates in schematic fashion the various powder and gas flow levels during the deposition process. The information contained in FIGS. 4, 5, 6 and 7 is used to develop the various schedules which are fed into the supervisory control memory and are then used to control the various system parameters during the fabrication of the seal. The information shown in FIG. 8 is in the nature of diagnostic information taken from the sensors during the deposition of the seal previously described with respect to FIGS. 4 through 6. Comparison of FIGS. 4 through 6 with the diagnostic information in FIG. 7 shows the potential of the system to produce a seal having a desired thermal history and compositional profile.

Although this invention has been shown and described with respect to a preferred embodiment, it will be understood by those skilled in this art that various changes in form and detail thereof may be made without departing from the spirit and scope of the claimed invention.

We claim:

1. A system for controllably delivering a gas stream containing entrained powder and having the capability to continuously vary the quantity of powder in accord with a predetermined schedule, which comprises:

a. flow control means for varying a carrier gas flow in response to a control signal, b. means for determining the carrier gas mass flow rate and for providing a signal indicative of carrier gas mass flow rate, c. means for determining the carrier gas pressure and for providing a signal indicative of carrier gas pressure, d. adjustable feed means for entraining a powder material in the flowing carrier gas, e. means for determining the radiation transmission through the combined stream of carrier gas and powder and providing a signal indicative of combined mass flow rate, f. means for accepting said carrier gas mass flow signal, said carrier gas pressure signal and said combined mass flow signal and for computing therefrom a powder mass flow value and for comparing said powder mass flow value with a predetermined schedule of powder mass flow values and for controlling said flow control adjusting feeder means so as to comply with said schedule.

* * * * *